United States Patent
Reiser et al.

(10) Patent No.: US 6,841,278 B2
(45) Date of Patent: Jan. 11, 2005

(54) FUEL CELL PERFORMANCE RECOVERY BY CYCLIC OXIDANT STARVATION

(75) Inventors: Carl A. Reiser, Stonington, CT (US); Ryan J. Balliet, West Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 28 days.

(21) Appl. No.: 10/160,384

(22) Filed: May 30, 2002

(65) Prior Publication Data

US 2003/0224228 A1 Dec. 4, 2003

(51) Int. Cl.[7] .............................................. H01M 8/00
(52) U.S. Cl. ............................. 429/13; 429/12; 429/17
(58) Field of Search ............................... 429/12, 13, 17

(56) References Cited

U.S. PATENT DOCUMENTS 6,096,448 A * 8/2000 Wilkinson et al. ............ 429/13
6,472,090 B1 * 10/2002 Colbow et al. ................ 429/13

* cited by examiner

Primary Examiner—Dah-Wei Yuan
(74) Attorney, Agent, or Firm—M. P. Williams

(57) ABSTRACT

Performance of a fuel cell stack (12) is recovered following long term decay by connecting (51) an auxiliary load (50) to the fuel cell while shutting off one or more of oxidant inlet valve (27a), oxidant pressure regulating valve (28a) or oxidant pump (26), which all may be achieved with a controller (46), to cyclically starve the cathode of oxidant so that it achieves hydrogen potential, e.g., less than 0.1 volts, for on the order of tens of seconds, repetitively, such as at every 10 or 20 seconds, while the auxiliary load remains connected, initially drawing 10 to 100 mASC, for example. Complete rejuvenation is obtained following 1800 or more cycles over a period of five or more hours.

9 Claims, 6 Drawing Sheets

FUEL CELL PERFORMANCE RECOVERY BY CYCLIC OXIDANT STARVATION

TECHNICAL FIELD

This invention relates to recovering performance in a fuel cell in which the voltage current characteristic has deteriorated over a long period of time of normal use (such as 500 hours or more), by performing at least 20 recurring cycles of on the order of ten seconds of oxidant gas starvation at the cathode.

BACKGROUND ART

It is known that operation of PEM (polymer electrolyte membrane) fuel cells for extended periods (several hundred or more hours) results in performance decay; that is, a reduction in output voltage at any given current density. It is also known that operating the fuel cell without oxidant tends to rejuvenate the fuel cell so that its performance is at least substantially recovered as is described, for instance, in U.S. Pat. No. 4,294,892. In PCT International Publication No. WO 01/01508, rejuvenation is carried out while the fuel cell continues to generate power by causing oxidant starvation of only a portion of each cell at any moment, or by periodic momentary oxidant starvation of all cells such that the interruption of power to the load is deemed to be inconsequential. However, evidence therein suggests that the rate of decay following such rejuvenation procedures is worse, further suggesting that this is not a long-term solution to the performance decay problem.

DISCLOSURE OF INVENTION

Objects of the invention include: improved regeneration of fuel cell performance following long-term decay; reducing the time required to rejuvenate a fuel cell following long-term performance decay; a more effective, long-term fuel cell rejuvenation method; rejuvenation of a fuel cell without causing an increase in the future rate or extent of performance decay; and fuel cell regeneration which can be simply implemented with an uncomplicated control scheme.

According to the present invention, performance of a PEM fuel cell is rejuvenated by operating the fuel cell with an auxiliary load to consume the oxygen within the cathode while repetitively cycling the cathode between at least stochiometric oxidant flow and no oxidant flow. According further to the invention, the rejuvenation cycles are on the order of tens of seconds, with oxidant flow in excess of stochiometric oxidant flow between 20% and 80% of the time and no oxidant flow between 80% and 20% of the time; typically the flow is on for 40% of the time and off for 60% of the time. It is important that the flow be off long enough for the cell voltage to be reduced to less than 0.100 volts and preferably less than 0.025 volts.

The invention has the surprising result that rates of decay not only do not increase following rejuvenation according to the present invention, but actually decrease, whereby the invention provides a methodology for increasing long-term fuel cell performance.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
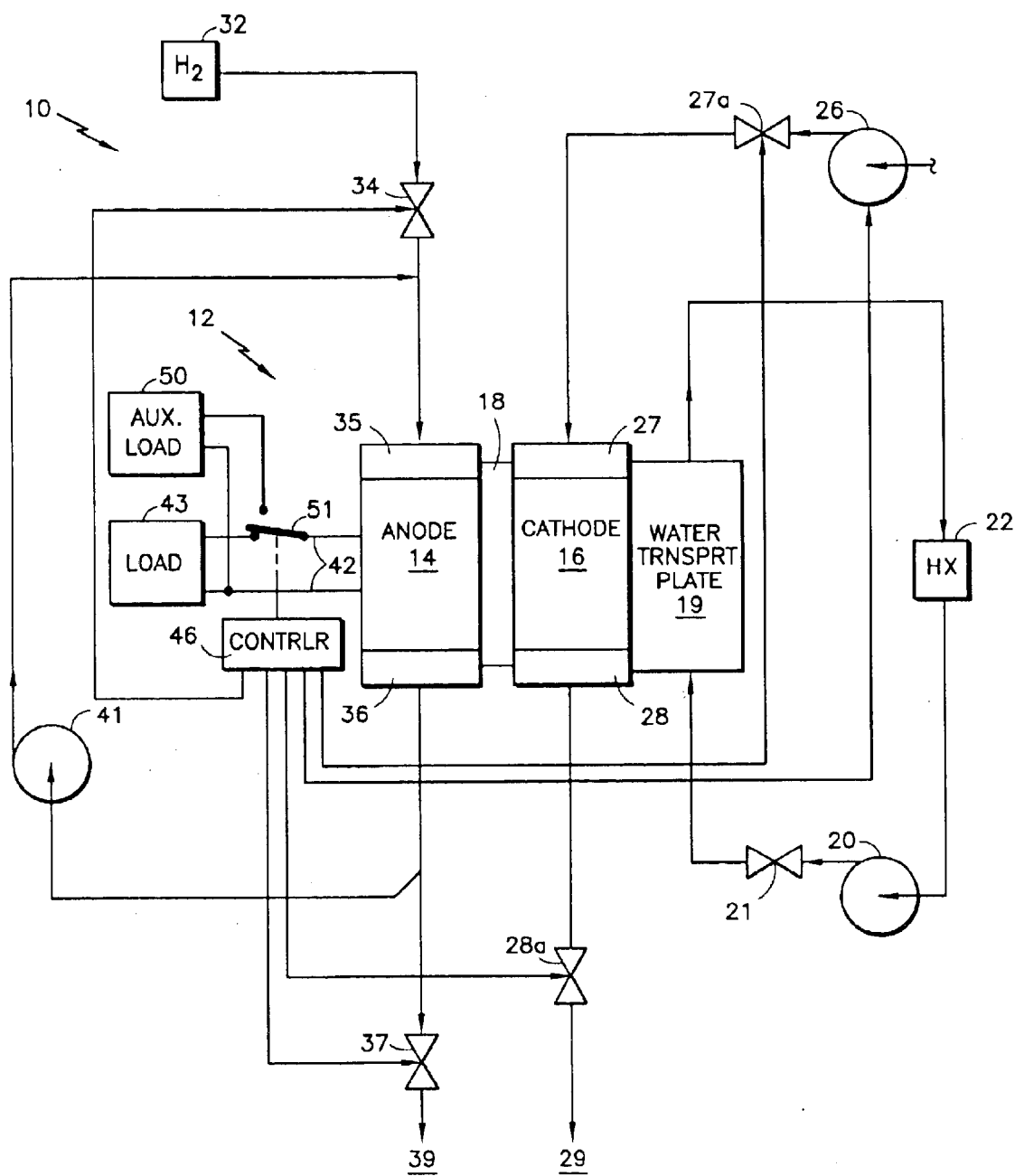
FIG. 1 is a simplified, stylized, schematic illustration of a fuel cell power plant including one cell of a fuel cell stack, capable of rejuvenation in accordance with the present invention.

Referring to FIG. 1, a fuel cell power plant 10 includes a cell stack assembly 12 which comprises a plurality of individual fuel cells stacked together in contiguous relationship, although only a single cell is illustrated in FIG. 1. Each fuel cell 12 includes an anode compartment 14, a cathode compartment 16, and a polymer electrolyte membrane 18. The anode compartment contains an anode and an anode flow field which are not shown. The anode consists of a catalyst adjacent to the polymer electrolyte membrane and a porous support plate all of which are known. The cathode compartment contains a cathode and a cathode flow field which are not shown. The cathode consists of a catalyst adjacent to the polymer electrolyte membrane and a porous support plate all of which are known. A water transport plate 19 (or coolant plate), adjacent to the cathode 16, is connected to a coolant control loop including a coolant pump 20, a coolant pressure control valve 21, and a heat exchanger 22. There may be a heat exchange bypass and other water management apparatus, not shown, as disclosed in U.S. Pat. No. 5,503,944. The pump 20 and valve 21 will regulate both the pressure and the volume of flow through the water transport plate 19 and through (or around) the heat exchanger 22. Air is supplied by a blower 26 through a valve 27a to a cathode oxidant flow field inlet manifold 27, the depleted air exiting the flow field through an exit manifold 28 and an oxidant pressure control valve 28a to exhaust 29. Fuel from a pressurized source 32 of hydrogen, or hydrogen rich gas, passes through a fuel pressure regulator 34, a fuel inlet manifold 35, the fuel flow field of the anode 14, and a fuel exit manifold 36 to a flow control valve 37. The valve 37, when open, vents the fuel flow field to ambient 39 (or any exhaust processor which may be used). The fuel flow field effluent may typically pass through a recycle loop including a blower 41. The fuel recycle blower typically has a flow rate that is greater than the fuel inlet flow rate in order to maintain a relatively uniform hydrogen composition across the anode flow field. This invention is applicable to cells that contain porous support plates as well as those that contain solid separator plates.

Current in the power lines 42 feed the load 43 of the fuel cell power plant when switch 51 connects the lines 42 to the load 43, as shown. A controller 46 may adjust the setting of the hydrogen pressure control valve 34 and the oxidant pressure control valve 27a, and the controller may also control the oxidant pressure control valve 28a, if desired, to ensure proper flow of reactants to the flow fields.

The controller 46 may also control the hydrogen exhaust flow valve 37 so as to purge trace contaminants periodically, such as at start up or shut down, or otherwise, as is conventional.

In accordance with the invention, an auxiliary load 50 may selectively be connected to the output of the fuel cell by means of the switch 51. The switch 51 may be operated manually or it may be operated by the controller 46. The auxiliary load may be selected to draw a suitable, less-than-normal current density at the beginning of a cycle, such as 10–110 mASC, and will result in cell voltages of 0.8–0.9 volts when the oxidant is flowing and 0.0–0.1 volts when the oxidant is interrupted. To practice the invention, the oxidant provided by the air pump 26 to the cathode flow field inlet manifold 27 must be interrupted for a short period of time, which may be on the order of between 10 and 20 seconds, periodically, such as every 10 or 20 seconds, repetitively, for a number of cycles which may range from 20 to 500 or more depending upon the degree of performance decay, the particular characteristics of the individual fuel cell involved, and so forth. The oxidant may be interrupted by shutting off the pump 26 in response to a signal from the controller, or by closing the valve 27a, or by closing the oxidant pressure control valve 28a. Or, various combinations of valve closings with or without shutting off the pump 26 may be effected in order to provide a suitably rapid, sufficiently complete reduction in oxidant at the cathode to bring the cathode to hydrogen potential for a suitable length of time (on the order of tens of seconds).

In the method of the invention, the normal load 43 will be disconnected from the stack 12 and the auxiliary load 50 will be connected to the stack by changing the position of switch 51, and will remain connected to the stack throughout the cycling process of the invention. Then some combination of closing the valves 27a, 28a and turning off the pump 26 will be utilized cyclically, with the auxiliary load constantly connected, for a sufficient number of cycles to rejuvenate the fuel cell to a desired performance level.

Figure 2:
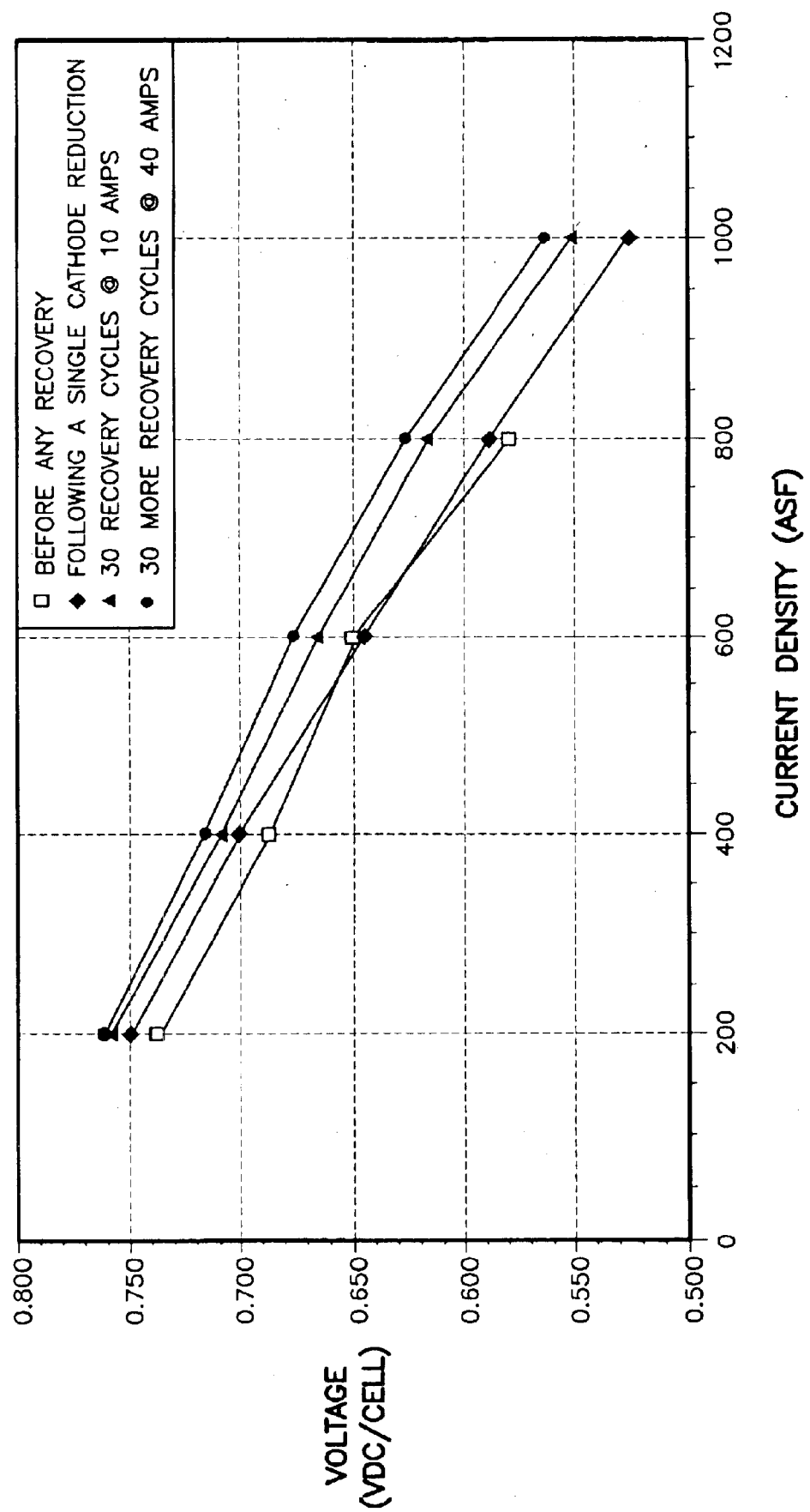
FIG. 2 is a plot of performance of a 75 KW PEM fuel cell stack before recovery, after a single reduction of cathode oxidant, after 30 recovery cycles at 27 mASC (milliamps per square centimeter), and after 30 more recovery cycles at 108 mASC, in accordance with the invention.

A 75 KW fuel cell stack with an active area of 400 $CM^2$ and containing membrane electrode assemblies made by W. L. Gore of Elkton, Md., Model 5561, was tested on hydrogen and air at an average cell temperature of about 65° C. at a total reactant pressure of about 100 kPa. FIG. 2 illustrates that recovery of performance after being tested for 170 hours, particularly at higher current densities, is effected by practicing the invention, the first 30 cycles having been performed with the auxiliary load drawing 27 milliamps per square centimeter (10 amps), and the last 30 cycles being performed with the auxiliary load drawing 108 milliamps per square centimeter (40 amps).

Figure 3:
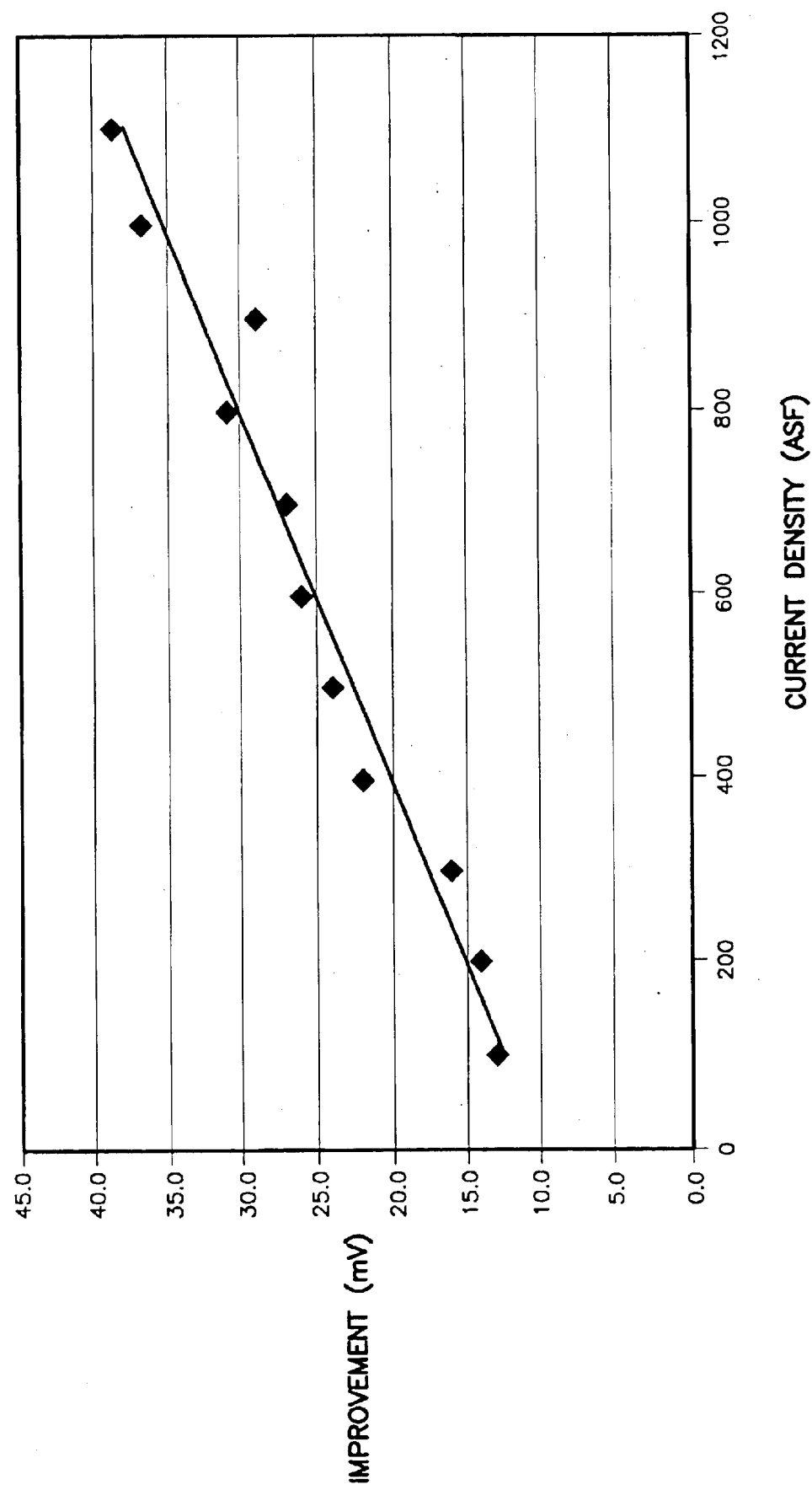
FIG. 3 is a plot of improvement in fuel cell voltage for various current densities following performance recovery cycles of the invention for a 20-cell stack.

FIG. 3 illustrates, for a 20-cell stack, with the same materials as described above, the improvement in fuel cell stack output voltage, as a function of current density with a normal load following rejuvenation by a plurality of oxidant starvation cycles, after 2300 hours of operation, in accordance with the present invention. FIG. 3 illustrates that the invention is significant in improving fuel cell performance at all current densities, but it is particularly effective for higher current densities.

Figure 4:
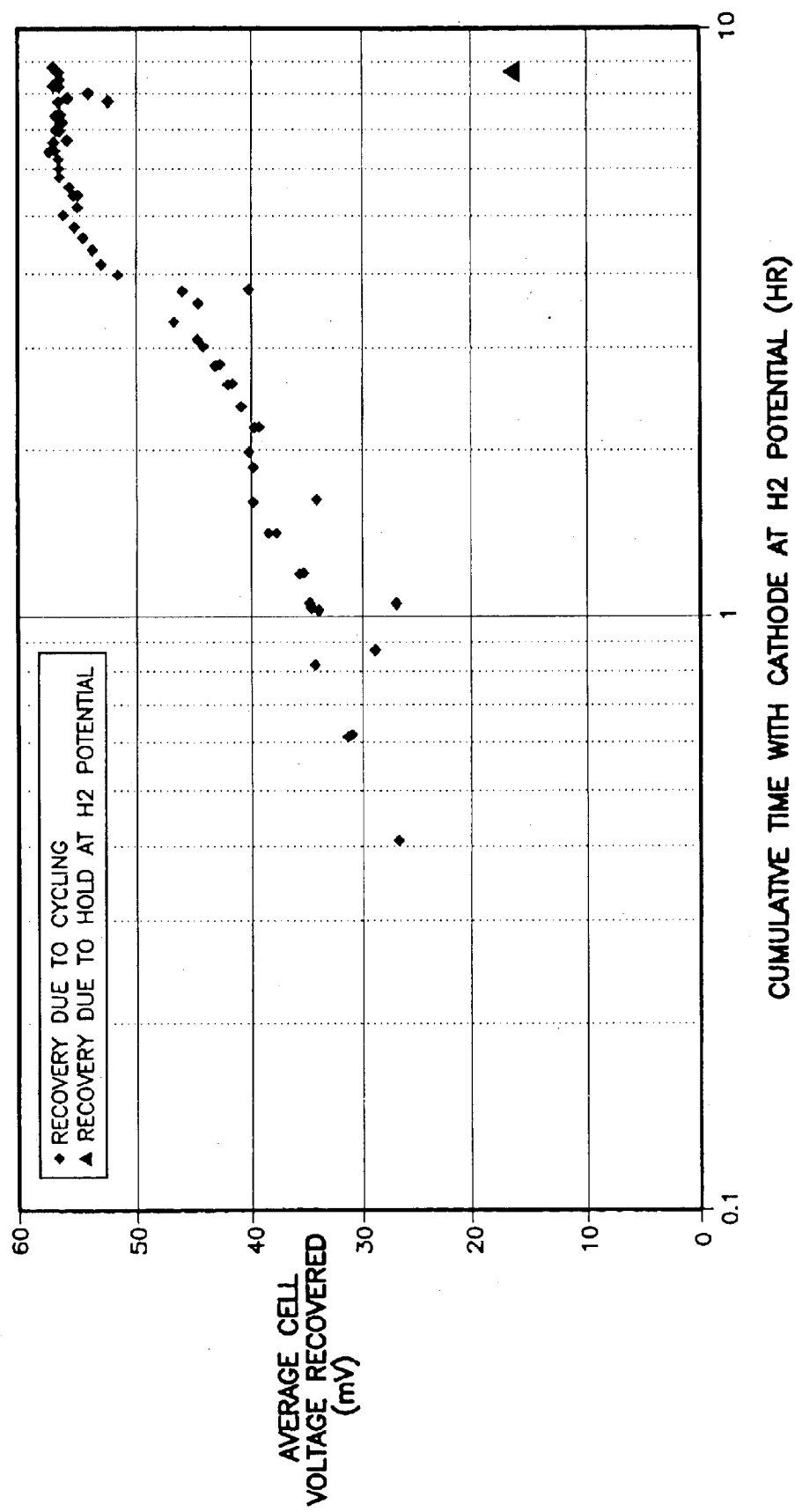
FIG. 4 is a plot of recovery due to cycling according to the invention compared with recovery due to holding a given hydrogen potential over time for a 20-cell stack.
Figure 5:
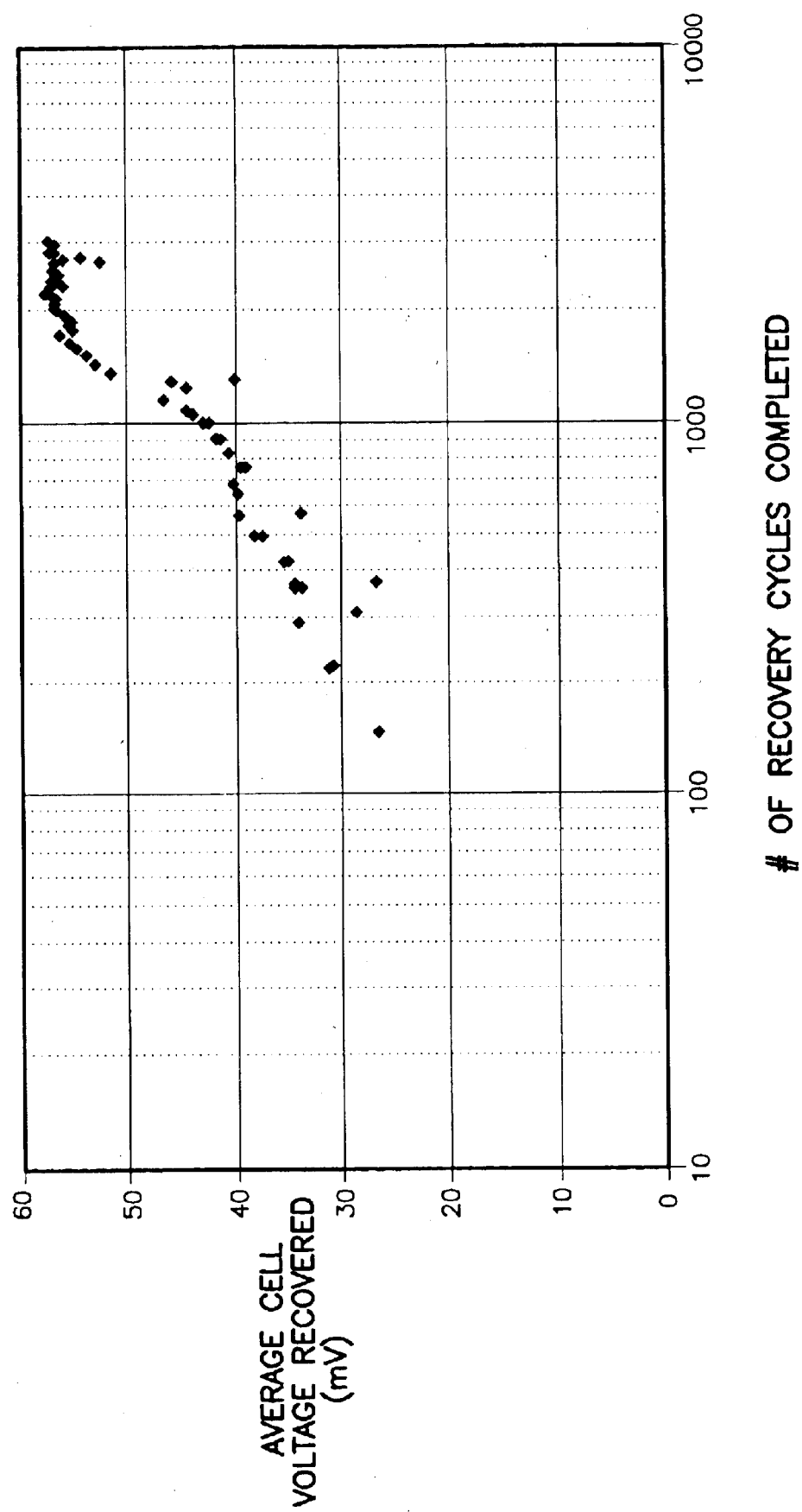
FIG. 5 is a plot of recovery, as in FIG. 4, as a function of number of cycles for a 20-cell stack.

In FIG. 4, the triangle illustrates the improvement in fuel cell performance for another 20-cell stack, with the same materials as described above, after holding the cathode at hydrogen potential for 8½ hours. The diamonds illustrate cycles performed according to the present invention showing that a maximal improvement occurred after about 1800 cycles of cathode oxidation reactant starvation, as shown in FIG. 5, carried out over about five hours.

Figure 6:
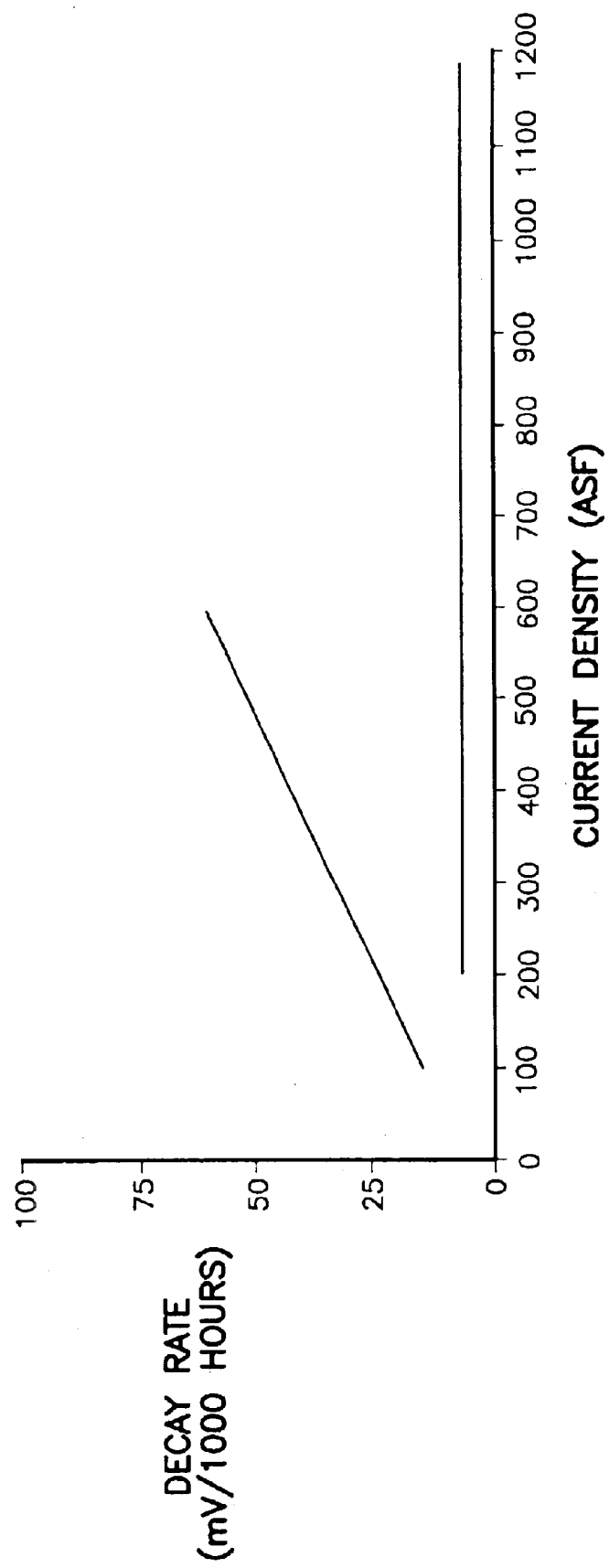
FIG. 6 is a plot of the rate of decay of fuel cell voltage as a function of current density for fuel cells not rejuvenated according to the invention (slopped line) compared with decay rate as a function of current density following rejuvenation according to the invention (flat line) for a 20-cell stack.

In FIG. 6, the rate of performance decay as a function of current density is plotted (the sloped line) for several fuel cells which have not been rejuvenated in accordance with the present invention. The long, nearly horizontal line illustrates the decay rate as a function of current density for a PEM fuel cell after rejuvenation in accordance with the invention.

The invention provides a higher degree of performance recovery in significantly less time than is achieved by methods of the prior art. Furthermore, the decay rate following recovery in accordance with the present invention is less than the decay rate where the present invention has not been performed.

All of the aforementioned patent documents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of regenerating the performance of a PEM fuel cell slack in which each cell has an anode flow field to which a hydrogen rich gas is continuously supplied, and has a cathode flow field to which oxidant reactant gas is provided by a pump, said fuel cell stack having a normal load, said method being performed after performance of the fuel cell stack has decayed as a consequence of operation for a period of time between several tens of hours and thousands of hours, said method comprising:

(a) disconnecting the normal load from said fuel cell stack and connecting in its place an auxiliary load for drawing a predetermined amount of current from said fuel cell stack; and (b) while said auxiliary load is connected to said fuel cell stack, repetitively, for a predetermined number of repetitions, totally interrupting the flow of oxidant reactant gas to the cathodes of all said fuel cells in said stack simultaneously for a period of time sufficient to reduce the cell voltage to less than 0.1 volts.

2. A method according to claim 1 wherein said period of time is sufficient to reduce the cell voltage to less than 0.025 volts.

3. A method according to claim 1 wherein said period of time is between 5 and 50 seconds.

4. A method according to claim 1 wherein there is between 5 and 50 seconds between each repetition.

5. A method according to claim 1 wherein said step (b) is performed by one or more of the following: shutting off said pump; blocking the flow of oxidant reactant gas between said pump and the cathode flow fields; and blocking the flow of oxidant reactant gas from exiting the cathode flow field.

6. A method according to claim 1 wherein said auxiliary load draws an initial current density on the order of between 10 milliamps per square centimeter and 110 milliamps per square centimeter.

7. A method according to claim 1 further comprising:

disconnecting said auxiliary load and reconnecting said normal load following said number of repetitions.

8. A method according to claim 1 wherein oxidant reactant gas is flowing between 20% and 80% of the time, and is not flowing between 80% and 20% of the time.

9. A method according to claim 1 wherein oxidant reactant gas is flowing 40% of the time and is not flowing 60% of the time.

* * * * *